UNITED STATES PATENT OFFICE.

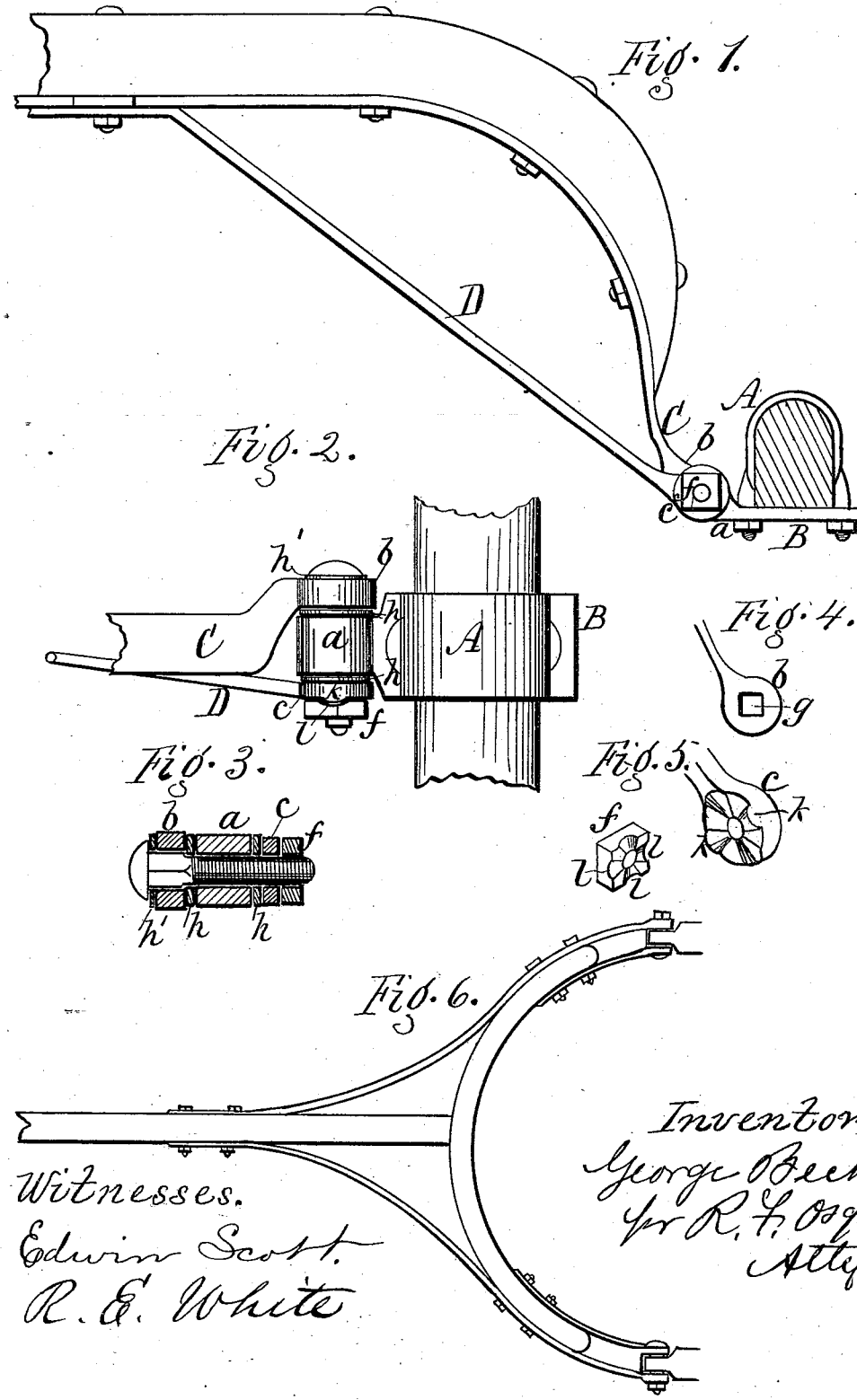

GEORGE BECK, OF CHARLOTTE, NEW YORK.

IMPROVEMENT IN VEHICLE-SHAFT COUPLINGS.

Specification forming part of Letters Patent No. 186,976, dated February 6, 1877; application filed August 22, 1876.

*To all whom it may concern:*

Be it known that I, GEORGE BECK, of Charlotte, in the county of Monroe and State of New York, have invented a certain new and useful Improvement in Carriage-Couplings; and I do hereby declare that the following is a full, clear, and exact description of the construction and operation of the same, reference being had to the accompanying drawings, in which—

Figure 1 is a side elevation of my improvement. Fig. 2 is a plan. Fig. 3 is an axial section of the coupling. Figs. 4 and 5 are detail views. Fig. 6 is a plan of a pole or shaft coupling.

My improvement relates to thill and pole couplings.

The invention consists in the construction and arrangement of parts hereinafter more fully described.

A represents the clip or band which passes around the axle. B is the base-bar of the same. C is the thill-iron. D is a rod or brace, which connects the front portion of the thill with the coupling, and extends across the arch at the rear of the thills. These parts are combined and arranged as follows: A knuckle or bearing, $a$, is formed either on the front end of the base-bar B or on the body of the clip. This serves as the shackle for connecting the parts. $b$ is a corresponding eye formed on the end of the thill-iron, and $c$ is a similar eye formed on the end of the rod or brace D. These eyes all come in the same axial line, and the eyes $b$ $c$ fit, respectively, on opposite sides of the knuckle $a$. The end of the thill-iron is bent outward laterally to bring its eye on one side; but the body of the thill-iron lies in line with the knuckle, so that the draft will be direct. $d$ is the coupling-bolt, which passes through the coupling in the ordinary way, and is secured by a nut, $f$. The end of the bolt next to the head is made square in cross-section, and fits in a corresponding square socket, $g$, of the thill-iron, as shown in Fig. 4, or is arranged in some equivalent way, so that the bolt will turn with the thill-iron in the vibrations of the latter, thereby obviating wear and avoiding rattling. It also holds the bolt stationary in turning the nut on or off, and avoids the use of two wrenches. $h$ $h$ are packings of leather, rubber, or equivalent material, situated between the shackle-head and bearings of the thill-iron and brace, and $h'$ is a corresponding packing resting between the thill-eye and head of the bolt. The outer face of the brace-eye is formed with a series of corrugations, $k$ $k$, and the inner face of the nut has corresponding corrugations $l$ $l$, as shown in Fig. 5. When the nut is turned up tight against the eye these corrugations fit together and prevent the nut from unscrewing. The nut can be turned up very tight by reason of the yielding of the packings $h$ $h$, and the expansion will prevent the loosening of the nut.

It will be noticed that the brace D extends from the coupling forward across the arch of the thill, and thus forms a brace or stay to prevent springing of the thill. The front attachment is preferably made in line with the cross-bar of the thills. In addition to this the brace forms a part of the coupling itself, fitting up in one side of the knuckle or bearing $a$, while the thill-eye fits upon the other. This twofold function of the brace secures greater ease and facility in connecting and disconnecting the coupling, and obviates the necessity of double jaws either on the axle-clip or the thill-eye. The brace, by attaching to the coupling, also takes the more direct strain, and prevents the straightening of the arch of the thill, which frequently occurs in ordinary carriages.

Another advantage results from the means employed for locking the nut, consisting of the corrugations on the faces of the brace-eye and nut, and the packings employed between the parts. The packings $h$ $h$ are absolutely essential to allow the parts to yield, as the nut is turned up, and then to expand to hold the corrugations in engagement. They not only hold the nut, but prevent rattling of the parts. Fig. 6 shows a shaft or pole coupling of similar arrangement.

The lock-nut above described can be employed for other uses than carriage-couplings, being adapted to any use where packings are employed in a similar manner.

Having thus described my invention, I do not claim, broadly, a notched or corrugated nut.

What I claim herein as new is—

1. In a carriage-coupling, the combination, with the knuckle $a$ and thill-iron C, of the rod D, performing the double office of a brace extending across the arch of the thills, and as a part of the coupling, as shown and described, and for the purpose specified.

2. A carriage-coupling, consisting of the knuckle $a$, thill-iron C, brace D, bolt $d$, and packings $h\ h\ h'$, the thill-iron and brace fitting on opposite sides of the knuckle, and the brace extending from the coupling across the arch of the thills, as shown and described, and for the purpose specified.

3. In a carriage-coupling, the combination, with the knuckle $a$ and the coupling-eyes $b\ c$, of the packings $h\ h$, resting between the knuckle and the said eyes, and the corrugated nut $f$ outside, bearing against a corresponding corrugated face of the brace-eye, as shown and described, and for the purpose specified.

In witness whereof I have hereunto signed my name in the presence of two subscribing witnesses.

GEORGE BECK.

Witnesses:
R. F. OSGOOD,
EDWIN SCOTT.